(12) United States Patent
Kilpatrick

(10) Patent No.: US 10,962,046 B2
(45) Date of Patent: Mar. 30, 2021

(54) MULTI-PART FASTENER FOR ATTACHING ACCESSORIES TO WIRE CAGES

(71) Applicant: Sharyn Kilpatrick, Piscataway, NJ (US)

(72) Inventor: Sharyn Kilpatrick, Piscataway, NJ (US)

( * ) Notice: Subject to any disclaimer, the term of this patent is extended or adjusted under 35 U.S.C. 154(b) by 314 days.

(21) Appl. No.: 15/626,010

(22) Filed: Jun. 16, 2017

(65) Prior Publication Data

US 2017/0363138 A1    Dec. 21, 2017

Related U.S. Application Data

(60) Provisional application No. 62/351,563, filed on Jun. 17, 2016.

(51) Int. Cl.
| | |
|---|---|
| *A01K 1/035* | (2006.01) |
| *F16B 43/00* | (2006.01) |
| *F16B 45/00* | (2006.01) |
| *F16B 2/06* | (2006.01) |

(52) U.S. Cl.
CPC .............. *F16B 43/00* (2013.01); *F16B 2/065* (2013.01); *F16B 45/00* (2013.01); *A01K 1/035* (2013.01); *A01K 1/0356* (2013.01)

(58) Field of Classification Search
CPC .......... F16B 2/065; F16B 23/00; F16B 35/06; F16B 43/00; F16B 43/025; F16B 45/00; A01K 1/00; A01K 1/00272; A01K 1/034; A01K 1/035; A01K 1/0356; A01K 15/02; A01K 31/06

USPC ................................. 411/400, 401; 119/467
See application file for complete search history.

(56) References Cited

U.S. PATENT DOCUMENTS

| | | | | |
|---|---|---|---|---|
| 864,796 | A * | 9/1907 | Neff ........................ | A01K 15/02 119/712 |
| 1,250,597 | A * | 12/1917 | Kyle ........................ | F16B 23/00 411/402 |
| RE17,926 | E * | 1/1931 | Leon ........................ | A01K 31/06 119/467 |
| 1,909,244 | A * | 5/1933 | Ahlman .................... | A01K 5/01 119/61.57 |
| 3,048,138 | A * | 8/1962 | Ryan ........................ | B63B 21/04 114/210 |
| 3,381,925 | A * | 5/1968 | Higuchi .................... | B61D 45/001 410/116 |
| 4,297,963 | A * | 11/1981 | Beacom ..................... | E02B 3/24 114/218 |
| 4,630,982 | A * | 12/1986 | Fenner .................... | B61D 45/001 410/102 |
| 5,035,560 | A * | 7/1991 | Watanabe .................. | F16B 21/086 411/508 |
| 5,669,329 | A * | 9/1997 | Krause .................... | A01K 1/0356 119/477 |

(Continued)

*Primary Examiner* — Roberta S Delisle
(74) *Attorney, Agent, or Firm* — Vladimir Tsirkin

(57) ABSTRACT

The present invention is directed at a wire-cage mountable multi-part fastener adapted for holding pet accessories. The fastener can be securely attached to a cage by mutually abutted fastener's female and male portions, from the inside and the outside of the cage, respectively. When said female and male portions are pressed into one other by threadable means while having the cage's bars sandwiched between them, the resulting friction allows the fastener to remain in a stationary relation to the cage.

8 Claims, 9 Drawing Sheets

(56) References Cited

U.S. PATENT DOCUMENTS

| | | | | |
|---|---|---|---|---|
| 5,713,305 | A | * | 2/1998 | Hollaway ............. A01K 1/0356 119/464 |
| 5,832,872 | A | * | 11/1998 | Pearce ................. A01K 1/0356 119/477 |
| 5,855,184 | A | * | 1/1999 | Eichler ................ A01K 1/0356 119/51.5 |
| 6,561,129 | B1 | * | 5/2003 | Cheng ................. A01K 1/0356 119/72 |
| 6,827,531 | B2 | * | 12/2004 | Womack ............. B61D 45/001 410/104 |
| 6,971,332 | B2 | * | 12/2005 | Woltmann ........... A01K 15/025 119/467 |
| 8,973,705 | B2 | * | 3/2015 | Guthrie .............. A62B 35/0006 182/3 |
| D836,531 | S | * | 12/2018 | Michel ........................ D12/317 |
| 10,595,505 | B2 | * | 3/2020 | Veness ................ A01K 1/0356 |
| 2012/0234250 | A1 | * | 9/2012 | Shamoon ............. A01K 5/0114 119/61.57 |
| 2015/0052712 | A1 | * | 2/2015 | Markiewicz ........... H02S 20/00 24/569 |

* cited by examiner

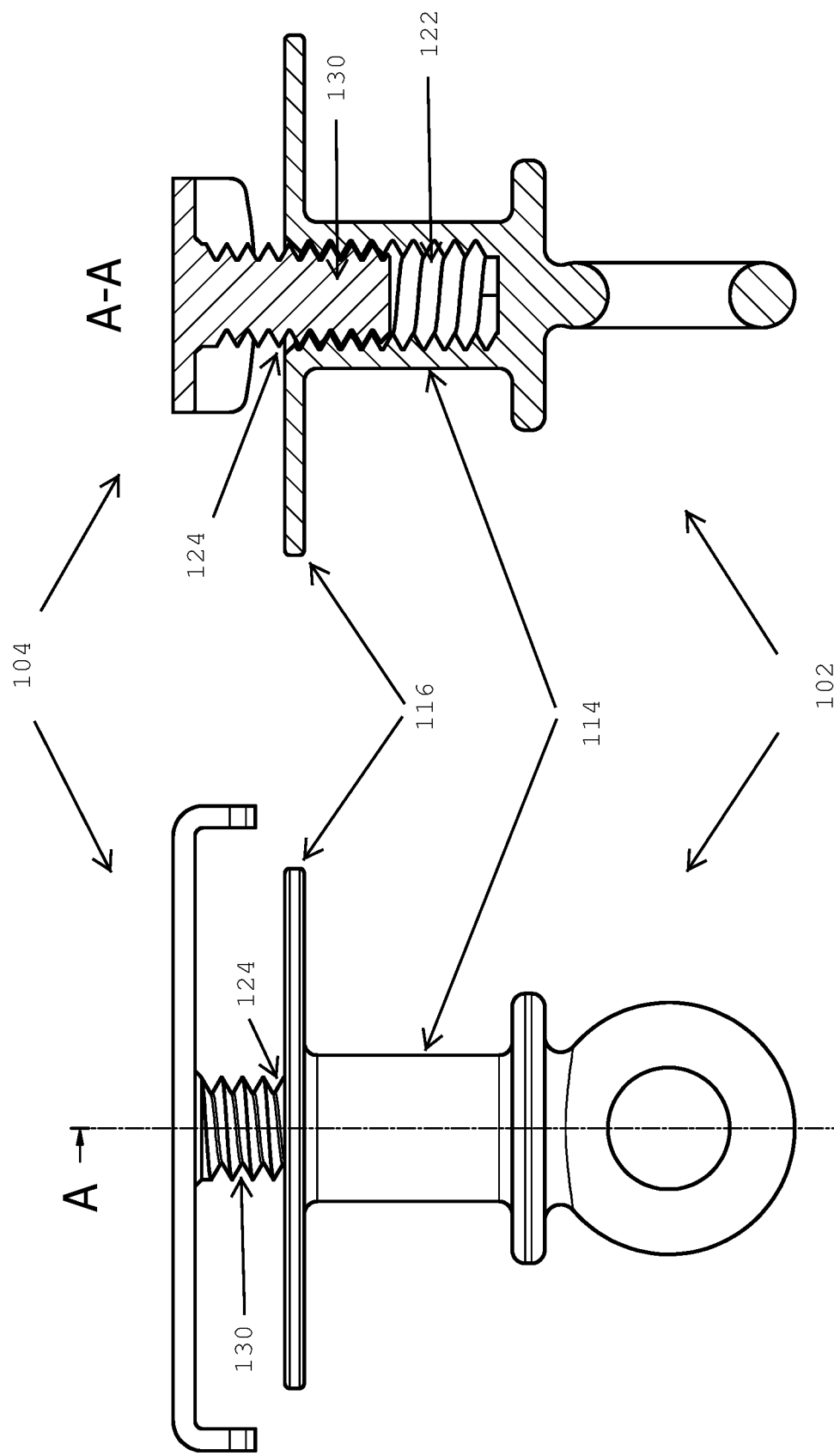

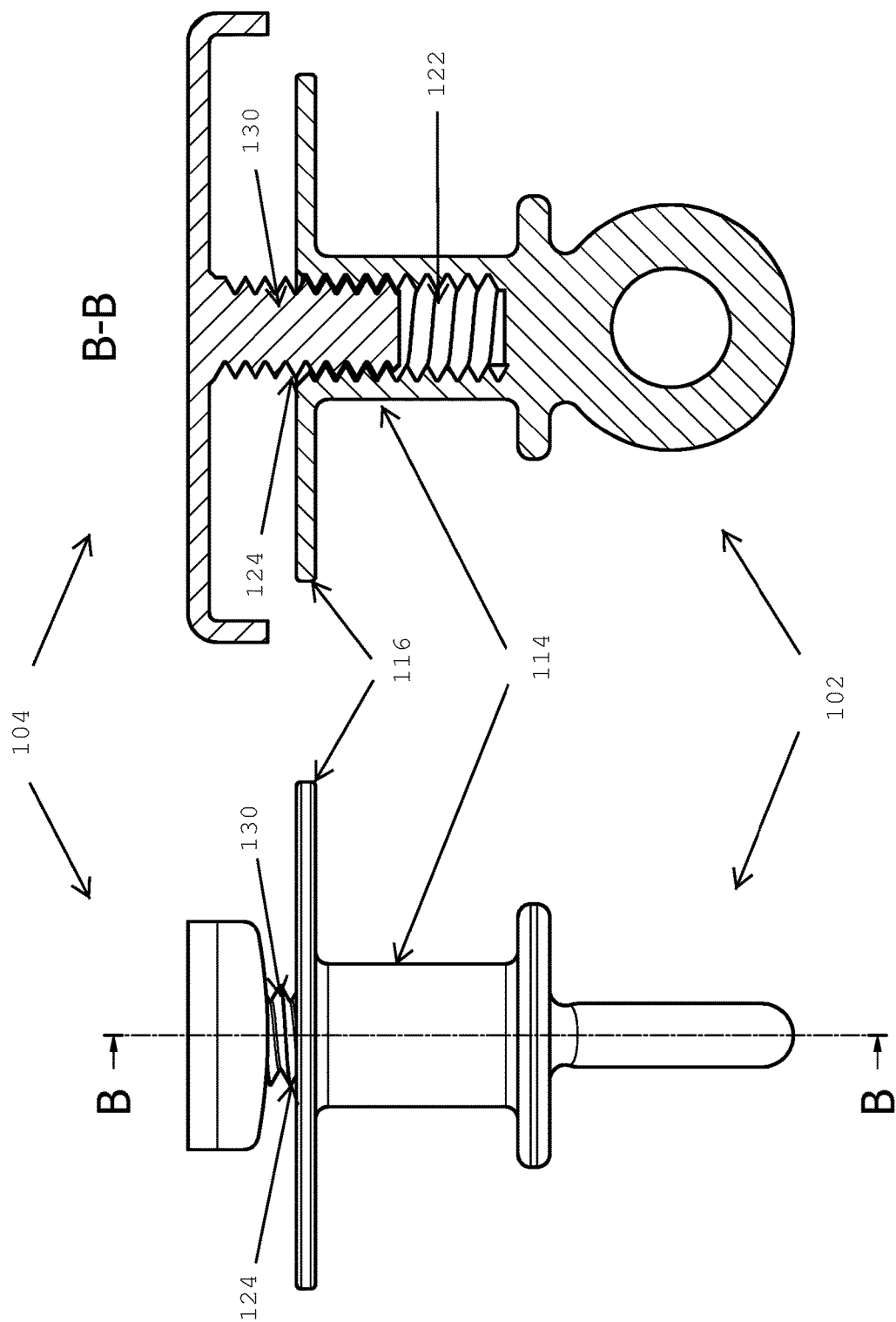

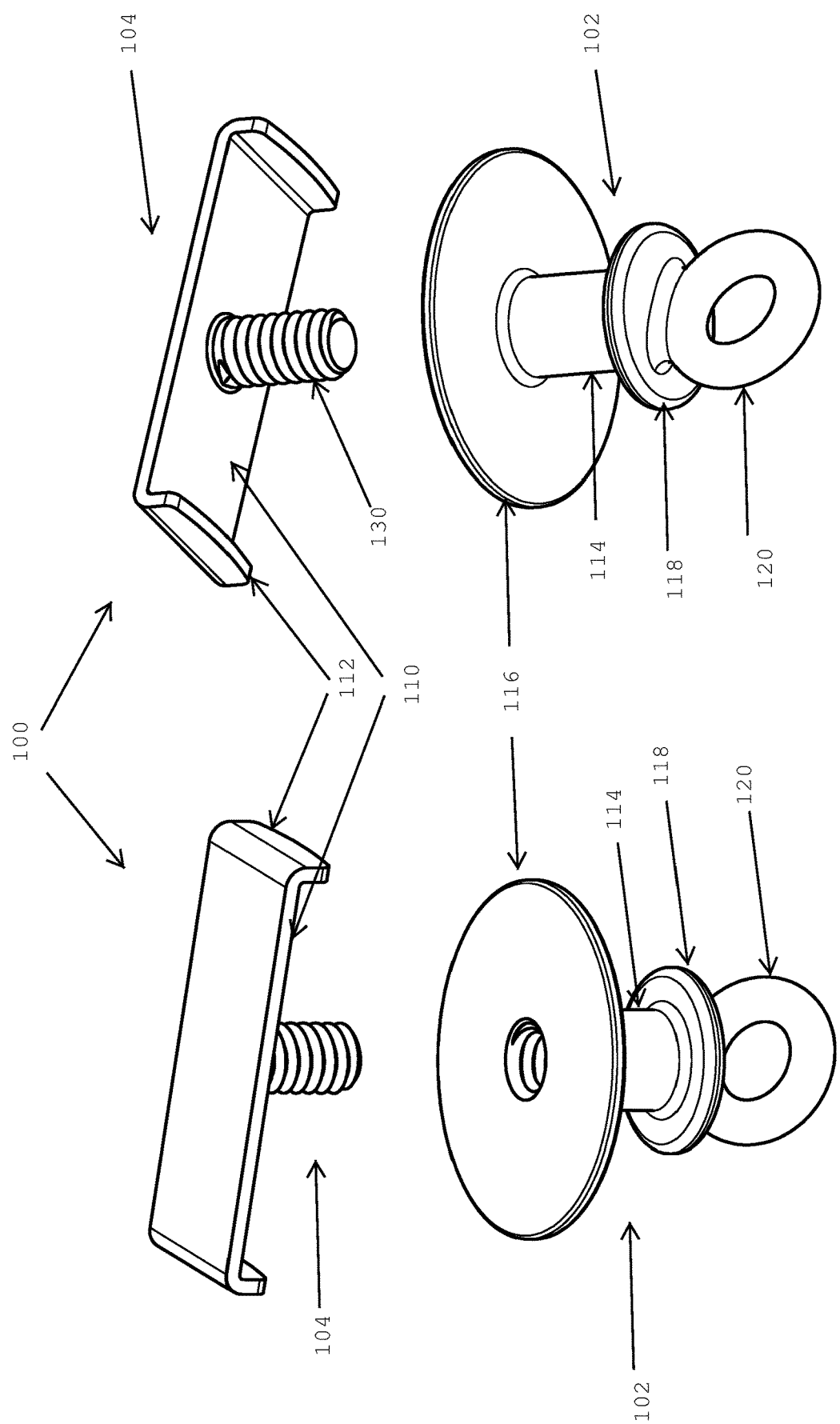

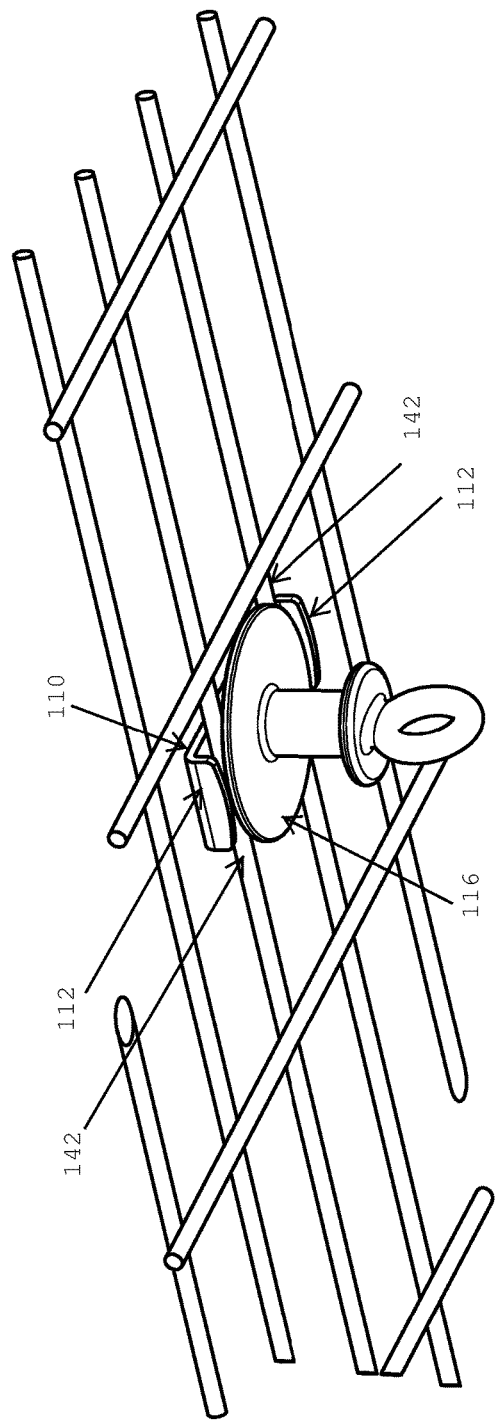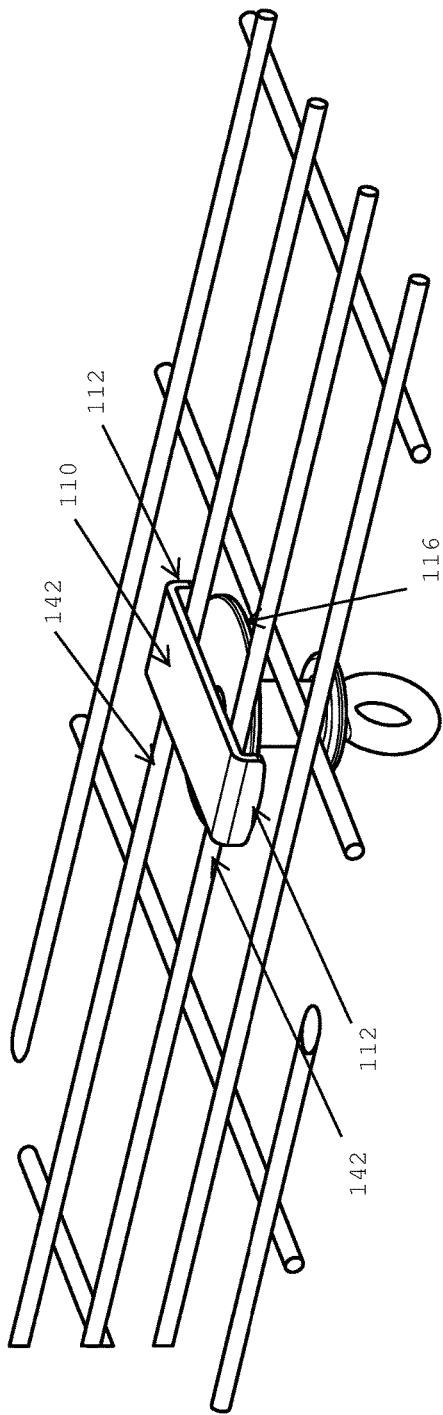

MULTI-PART FASTENER FOR ATTACHING ACCESSORIES TO WIRE CAGES

This application claims the benefit of U.S. Provisional Application No. 62/351,563, filed Jun. 17, 2016.

FIELD OF THE INVENTION

The present invention is in the technical field of pet cages, and, more particularly, in the field of pet cage accessories. Specifically, the present invention offers a fastener that can be attached to wire cages of different shapes and sizes, and adapted to holding pet accessories, such as toys, feeders, or chewables.

BACKGROUND OF THE INVENTION

Domesticated birds are one of the most popular choices for pet owners. They bring joy and companionship to millions of families. A bird's cage is his home and should provide the bird all the comforts of the home. A happy bird is a healthy bird, and for the bird to be happy, he must be constantly entertained and stimulated; thus, it is impossible to overestimate the importance of toys and accessories for the bird's well-being.

One of the common problems with many bird cages is the inability to place toys and accessories in the locations within the cage where those toys are needed the most. Many cages restrict where these toys and accessories can be attached due to their designs. A good example of this are dome top-shaped cages. As they are beautifully designed, the dome top restricts a bird owner as to where the toys or accessories can be hung. Due to natural gravity, a vast majority of toys and accessories in the market today cannot be hung in the desired top area of the cage as they will slide down between bars and/or not stay in place. This includes hanging the toys and/or accessories vertically or horizontally. It is important that pet birds do not become bored in their cage environment, and rearranging of their toys and accessories is essential for their stimulation and healthy activity.

Typically, the most common approach to attaching a hanging accessory to the cage is mechanically securing the accessory to the cage by a clip, a hanger, a nut, a padlock, or the like. Other solutions utilize chain repair links, where the accessory is removably attached to one side of the link while the other side is placed over a bar of the cage. While the foregoing solutions are efficient when used on regularly-shaped cages, they are deficient when used on irregularly-shaped cages, such as dome top-shaped cages.

By utilizing common attaching techniques, the pet owner is unable to secure the accessory to a dome top-shaped portion of the cage because the accessory will inevitably slide down to a more horizontal portion of the cage. Thus, all hanging accessories are usually attached to regularly-shaped surfaces of the cage, such as vertical walls or horizontal portions of the ceiling, leaving the most spacious and focal dome- or spherical portions of the cage unutilized. In addition, this unevenly distributed hanging accessories may create unsafe conditions to the pet and damage the cage itself due to scratches.

In light of the foregoing, there is a clear need, particularly in the pet appliance industry, for a simple and inexpensive self-attaching fastener for securing hanging accessories to cages of various shapes and sizes, the fastener that will provide the pet owner with an ability to place the accessory anywhere in the cage without any limitations caused by the cage's shape. In addition, the self-attaching accessory fastener offered by the present invention will allow the pet owner to distribute hanging accessories more evenly; thus, increasing space utilization inside the cage.

SUMMARY OF THE INVENTION

The present invention directed at a fastener adapted to be removably attached to any place within the cage to hold a hanging accessory in place without sliding up or down the bars, while preventing a pet from pulling the fastener inside the cage. It also allows the pet owner to place any accessory anywhere in the cage without any regard to the cage's shape or size.

The self-attaching fastener offered by the present invention comprises female and male portions threadably attached to each other. The male portion comprises a rectangular plate and an externally threaded shank projecting inwardly from the plate through a cage and into the female portion. The female portion comprises a sleeve with an internally threaded chamber adapted to receive the shank of the male portion, an annular flange on one end of the sleeve, and an end loop portion on the other end.

When the fastener is secured to the cage, the plate of the male portion is placed through the cage's surface so that it rests on the exterior surface of the cage, while the flange of the female portion is pressed against that plate from the inside of the cage. Since the flange of the female portion is pressed outward against the interior side of the cage while the plate of the male portion is pressed inward against the exterior side of the cage, resulting friction allows the fastener to be held securely anywhere on the cage's surface. Once the fastener is secured to the cage, a hanging accessory, such as a toy, may be attached to its end loop.

The flange and the plate are sized in such a way that they overlap at least two adjacent parallel bars of the cage. Because of that, in a fully engaged position, the fastener cannot be pulled through the bars inside the cage or otherwise removed from the cage by a pet. In addition, the flange shields the plate from the pet, thus, positioning the plate out of the pet's reach.

The unique pet cage fastener offered by the present invention provides pet owners, especially domestic bird owners, with ability to securely place hanging accessories anywhere in the cage.

BRIEF DESCRIPTION OF THE DRAWINGS

These and other features of this invention will be more readily understood from the following detailed description of the various aspects of the invention taken in conjunction with the accompanying drawings.

FIG. 3 is a front elevational view of the fastener according to the present invention;

FIG. 3A is a cross-sectional view along line A-A of FIG. 3;

FIG. 4 is a side elevational view of the fastener according to the present invention;

FIG. 4A is a cross-sectional view along line B-B of FIG. 4;

FIG. 5 is a top perspective view of the fastener according to the present invention showing its components in unassembled;

FIG. 6 is a bottom perspective view of the fastener according to the present invention showing its components in unassembled;

FIG. 7 is a bottom perspective view of the fastener according to the present invention installed on a cage;

FIG. 8 is a bottom perspective view of the fastener secured to the cage;

DETAILED DESCRIPTION OF THE INVENTION

Figure 1:
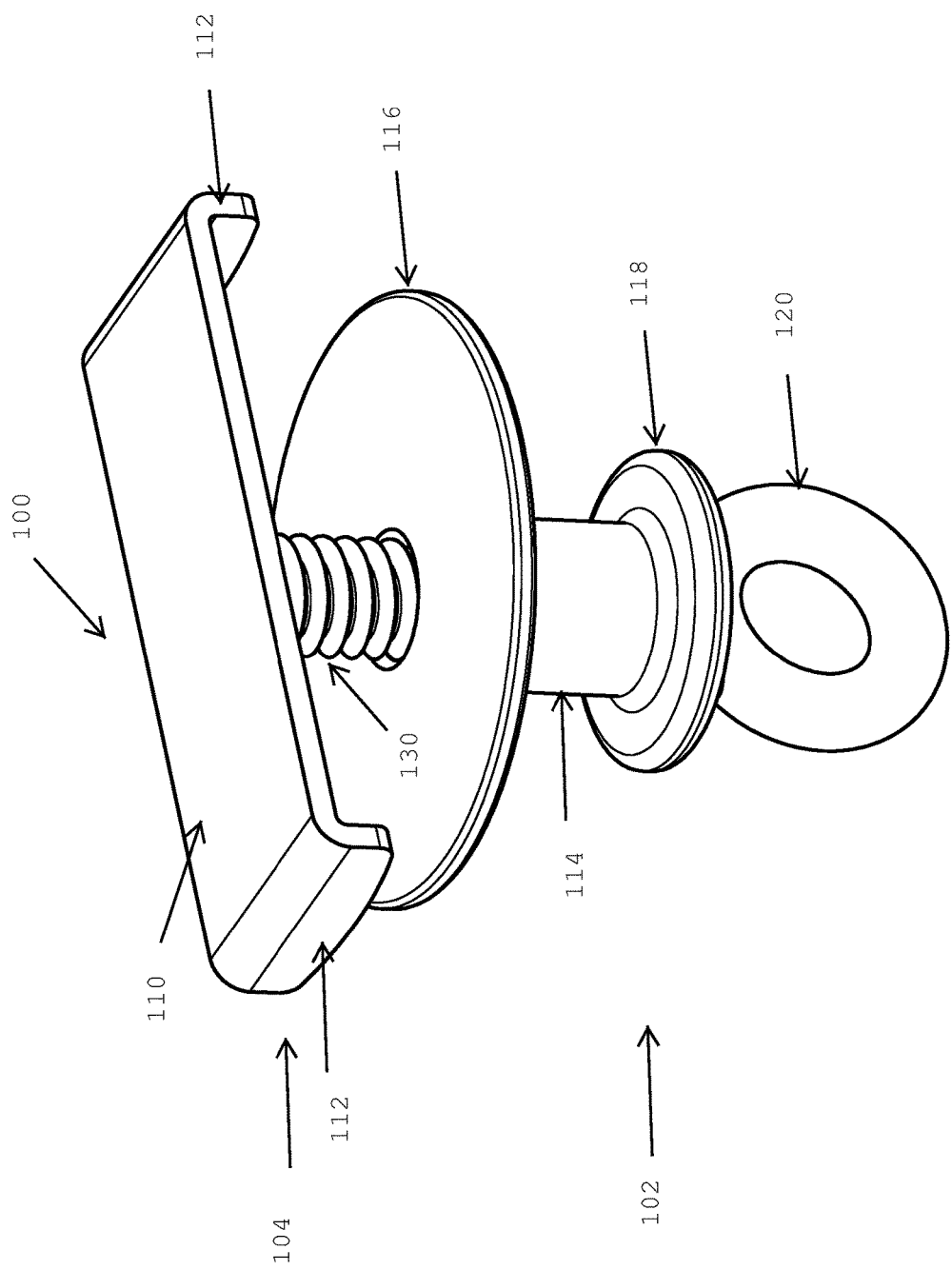
FIG. 1 is a top perspective view of the fastener according to the present invention, showing its components in an assembled relation.
Figure 2:
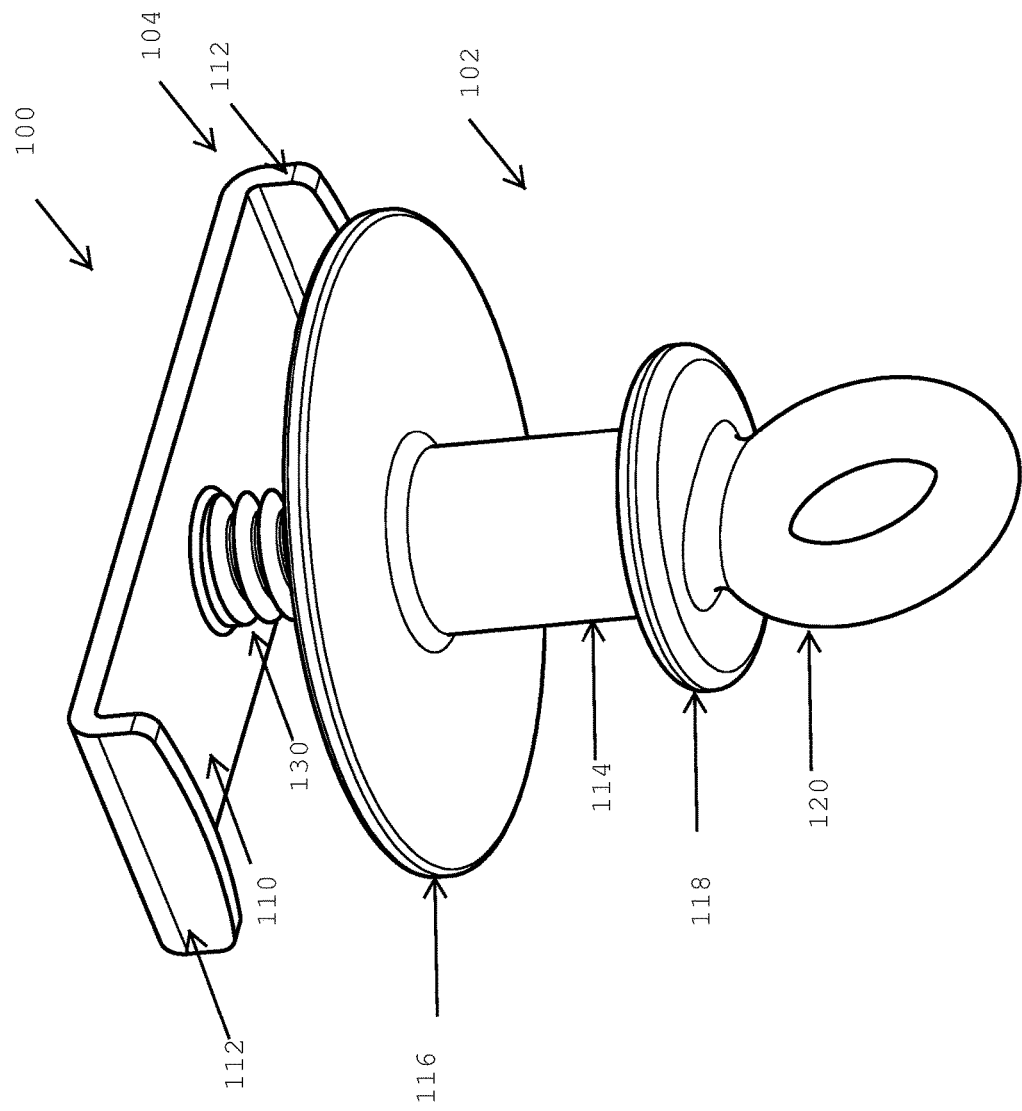
FIG. 2 is a bottom perspective of the fastener according to the present invention, showing its components in an assembled relation.

The following is a detailed description of the invention provided to aid those skilled in the art in practicing in the field of the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

The present invention is directed at a multi-part fastener adapted to be securely attached to a wire cage for hanging a pet accessory. The fastener allows the pet owner to place the accessory anywhere in the cage without any limitations caused by a particular shape of the cage.

Referring to FIGS. 1 2, 5 and 6, the self-attaching accessory fastener 100 for use in wire cages for housing domestic birds or small animals is shown comprising a female 102 and a male 104 portions. Female portion 102 of the fastener comprises cylindrical sleeve 114 with radially extending flanges 116 and 118 on sleeve's respective opposite ends.

Figure 9:
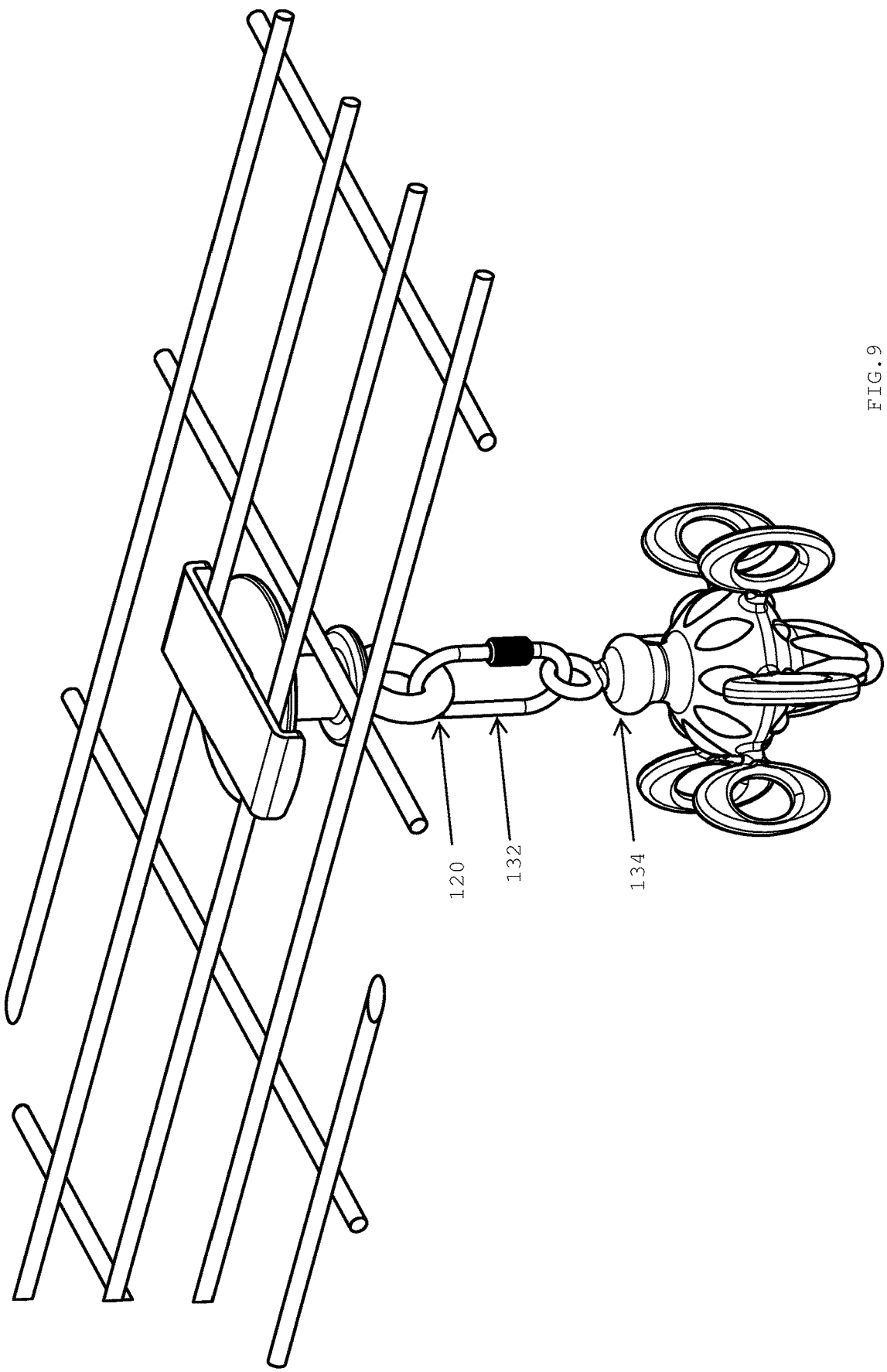
FIG. 9 is a bottom perspective view of the fastener with an optional coupling link and a toy attached.

Extending away from flange 118 in an opposite direction from sleeve 114 is an end loop portion 120. In some embodiments, end loop portion 120 may be attached to flange 118 by rotatable means, such as a swivel, a bearing, or the like. As shown on FIG. 9, the end loop portion 120 is configured to receive an optional pet toy or a pet accessory 134 via a coupling link 132, such as a carabiner.

Referring back to FIGS. 1, 2, 5 and 6, male portion 104 comprises a rectangular plate 110 and an externally threaded shank 130, which is projected inwardly from the center of plate 110; thus, forming a T-shaped structure. In addition to external threading, in some embodiments, shank 130 may comprise a male fastening means, such as a threaded stud, a bolt, or a snap-mount connector.

In some embodiments, in order to improve stability of the fastener's attachment to a cage, two respective axial ends 112 of plate 110 are curved inwardly forming substantially 90 degrees' angles with plate 110.

As it can be seen from FIGS. 7 and 8, once the fastener is fully attached to the cage, ends 112 are engaged with the cage's bars 142; thus, preventing fastener 100 from being rotated or moved when torsional forces are applied.

Now referring back to FIGS. 1, 2, 5 and 6. In a preferred embodiment, said shank portion 130 is attached to plate 110 by mechanical means, such as soldering, welding, or via a riveted or screwed join. In other embodiments, a wingnut can be attached to first axial end shank portion 130. In these embodiments, shank 130 is projected through an aperture in the center of plate 110, such that the wingnut rests on plate 110 while shank portion protrudes through plate 110 and into the cage.

Referring now to FIGS. 3, 3A, 4, and 4A, sleeve 114 defines cylindrical chamber 122 with an annular aperture 124 in the center of flange 116 on the side opposite of sleeve 114. The inner surface of chamber 122 is internally threaded, such as it is adapted to adjustably receive externally threaded shank 130. In addition, instead of internal threading, chamber 122 may be equipped by other fastening means, such as a connecting bore adapted to receive a male fastener, a rivet, or a snap-in connector.

Thus, when in an engaged relation, shank 130 extends through aperture 124 and into internally threaded chamber 122. By rotating female portion 102 relative to male portion 104, respective external and internal threads of shank 130 and chamber 122 get engaged further into each other, until female 102 and male 104 portions are fully abutted.

Referring now back to FIGS. 7, and 8, when fully engaged, female 102 and male 104 portions are an abutted relation, with cage bars 142 being sandwiched between them. In that position, flange 116 abuts against the cage from the inside, while plate 110 abuts against the cage from the outside; thus, securing the fastener at the location of choice. In addition, axial ends 112 are engaged with sides of bars 142; thus, preventing the fastener from being rotated or moved when torsional forces are applied. In some embodiments, to enhance the frictional fit, flange 116 and plate 110 may equipped washers made of a resilient material, such as polyethylene or rubber.

Figure 10:
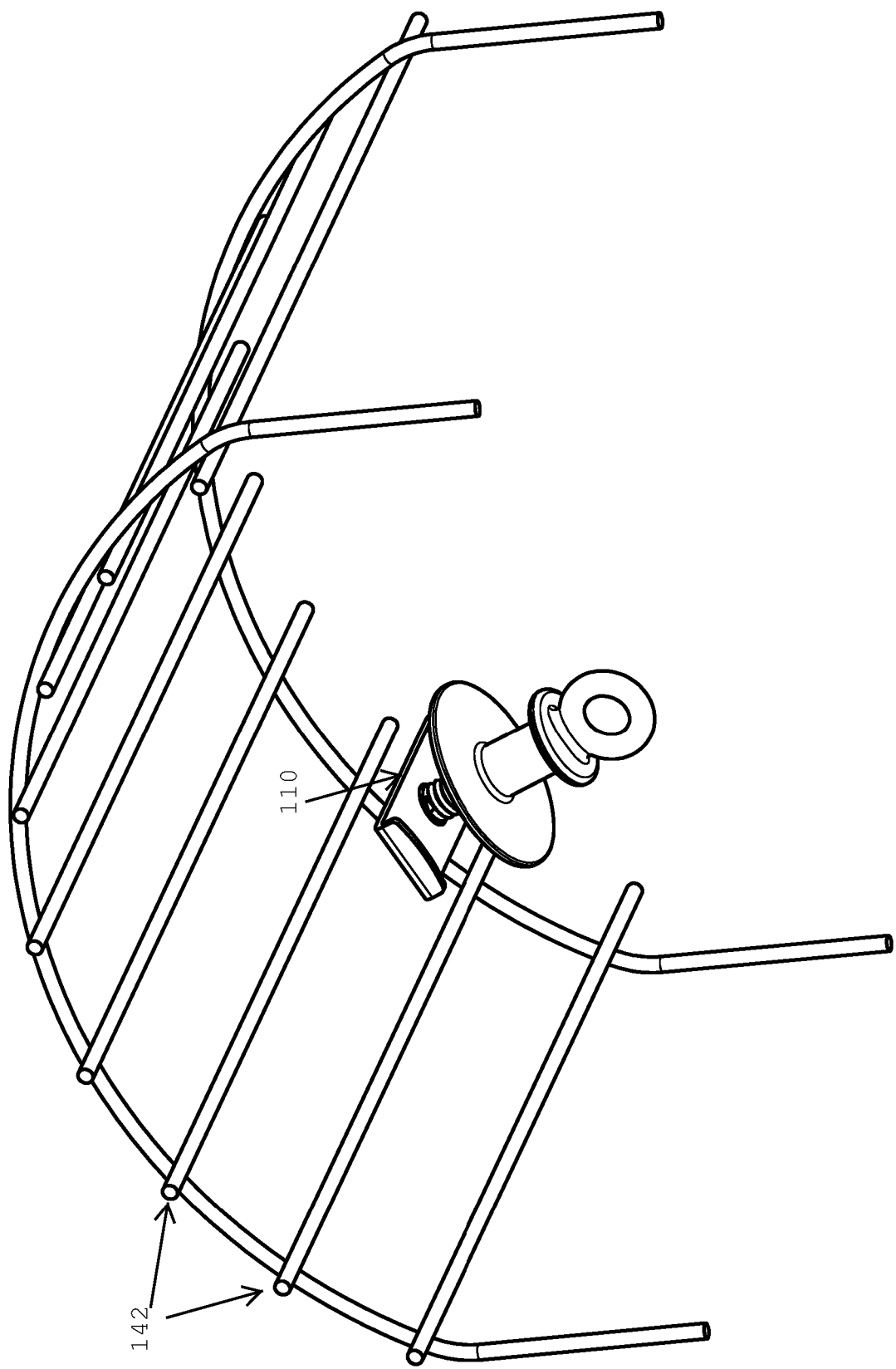
FIG. 10 is illustrating the step of passing the plate through the cage's bars.
Figure 11:
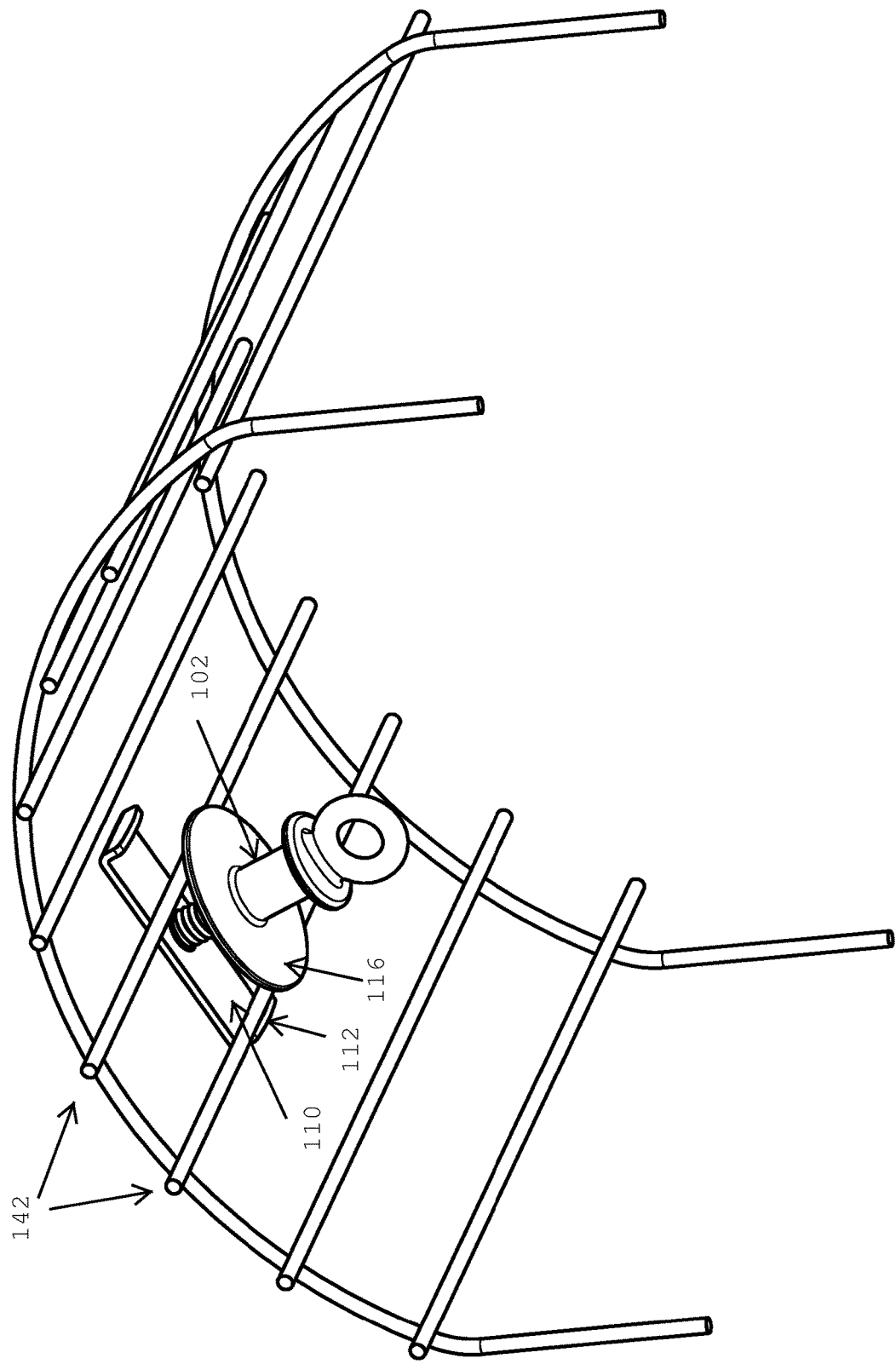
FIG. 11 is illustrating the securing the fastener to the cage.

Referring now to FIG. 10. For ease of installation, the width of plate 110 is narrower than the distance between two adjacent bars 142 at the location of the installation, such that plate 110 can pass through the two adjacent bars 142 from the inside of the cage to the outside. As can be seen from FIG. 11, once plate 110 clears through bars 142, it is rotated 90 degrees, such that plate 110 becomes positioned substantially perpendicular to bars 142. By pushing fastener inward, a user causes plate 110 to rest on bars 142 while female portion 102 is being screwed onto shank 130, until flange 116 and plate 110 become fully abutted with the inside and outside of the cage, respectively. In an embodiment where plate 110 comprises axial ends 112, the axial ends further engage with sides of bars 142; thus, providing additional stability to the fastener secured to the cage.

The forgoing installation method is different in a wingnut embodiment of the present invention. With the wingnut embodiment, attaching male 104 and female 102 portions can be achieved not only by rotating female portion 102, but by rotating the wingnut itself.

By mounting male 104 and female 102 portions to the cage surface and against each other, the present invention completely eliminates the problems of the toy holder being moved by playing pets, or under the weight of the attached accessory.

In the preferred embodiment, the fastener is made of stainless steel. In other embodiments, it can be constructed of any solid hard-surfaced polymers. The main requirement for the material is that the animal should not be able to penetrate the surface of the fastener with beaks, claws or teeth; thus, the fastener can be constructed of safe to birds and other pets' metals, high impact nylons or the like material, and may be cast or cold formed by any methods known in the art.

The overall size of the fastener depends on the distance between adjacent bars in the location of installation, thickness of the bars, and the overall size of the cage; therefore, it must be understood that the following dimensions are for illustrative purposes only, as, depending on the foregoing factors, they should be modified to accommodate for the actual size of a particular cage and its bars:

| Part | Dimensions |
| --- | --- |
| Rectangular Plate 110 | 40 mm × 15 mm × 4 mm |
| Axial Ends 112 | 4 mm × 15 mm |
| Flange 116 | ø 32 mm |
| Sleeve 114 | 15 mm × 9 mm |
| Loop end 120 | ø 16 mm (external), 8 mm (internal) |
| Female portion 102 | 32 mm (length) |
| Male portion 104 | 14 mm (length) |

It is to be appreciated that the disclosure and drawings are not limiting, as the particular shape of the apparatus may be varied to meet the particular size or shape of the cage on which it is to be mounted.

The orientation and the arrangement of the various elements, particularly the holding members, may be adapted to particular needs all in accordance with the invention. Thus, the present invention provides a new and useful fastener to be mounted to the cage's surface of any shape, which reduces problems associated with the prior art in hanging accessory-attaching apparatuses.

The description of the present embodiment has been presented for purposes of illustration, but is not intended to be exhaustive or to limit the invention to the form disclosed. Many modifications and variations will be apparent to those of ordinary skill in the art.

Those of ordinary skill in the art will appreciate that the hardware depicted herein may vary depending on the implementation. The depicted example is not meant to imply architectural limitations with respect to the present invention.

Herein above, or in the following claims, the term "comprises" is synonymous with "includes." The use of terminology such as "X comprises A, B and C" is not intended to imply that A, B and C are necessarily the only components or most important components of X.

Unless clearly and explicitly stated, the claims that follow are not intended to imply any particular sequence of actions. The inclusion of labels, such as a), b), c) or 1), 2), 3) etc., for portions of the claims does not, by itself, imply any particular sequence, but rather is merely to facilitate reference to the portions.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention

I claim:

1. A wire-cage mountable multi-part fastener for holding pet accessories inside a cage comprising:
a female portion further comprising a sleeve having an internally threaded chamber, a first end and a second end, wherein said first end is radially extending into a first flange having an aperture opening into said chamber extending therefrom, and wherein said second end is radially extending into a second flange that, in turn, is extending into an end loop portion; and
a male portion further comprising a plate having a first axial end and a second axial end, and a substantially perpendicular to said plate and externally threaded shank portion projecting inwardly from a center of said plate.

2. The multi-part fastener as in claim 1, wherein said chamber is adapted to threadably receive said shank portion through said aperture opening until said plate and said first flange are abutted against each other.

3. The multi-part fastener as in claim 1, wherein said end loop portion is attached to said second flange by rotatable means.

4. The multi-part fastener as in claim 1, wherein said end loop portion is adapted to receive a pet accessory via a coupling link.

5. The multi-part fastener as in claim 1, wherein said plate is a rectangular.

6. The multi-part fastener as in claim 1, wherein said diameter of said first flange exceeds a distance between two adjacent parallel cage bars at a location of installation.

7. The multi-part fastener as in claim 1, wherein said diameter of said first flange is narrower than an axial length of said plate.

8. The multi-part fastener as in claim 1, wherein a width of said plate is less than said distance between said adjacent parallel cage bars.

* * * * *